United States Patent
Lane et al.

(10) Patent No.: US 8,726,790 B2
(45) Date of Patent: May 20, 2014

(54) MILK FROTHING DEVICE

(75) Inventors: Gary Lane, Radlett (GB); Alan Green, Radlett (GB)

(73) Assignee: Green Lane Designs Limited (GB)

( * ) Notice: Subject to any disclaimer, the term of this patent is extended or adjusted under 35 U.S.C. 154(b) by 157 days.

(21) Appl. No.: 13/257,344

(22) PCT Filed: Mar. 19, 2010

(86) PCT No.: PCT/GB2010/050469
§ 371 (c)(1),
(2), (4) Date: Sep. 19, 2011

(87) PCT Pub. No.: WO2010/106372
PCT Pub. Date: Sep. 23, 2010

(65) Prior Publication Data
US 2012/0167781 A1 Jul. 5, 2012

(30) Foreign Application Priority Data
Mar. 19, 2009 (EP) .................................. 09155628

(51) Int. Cl.
*B01F 3/04* (2006.01)
*A47J 31/00* (2006.01)
*A23C 9/00* (2006.01)

(52) U.S. Cl.
USPC ........... 99/323.1; 99/348; 261/84; 261/119.1; 261/DIG. 26; 366/146; 366/282; 366/314; 366/325.6; 366/343

(58) Field of Classification Search
USPC ......... 99/348, 287, 323.1; 366/144, 146, 279, 366/282, 314, 325.6, 343; 261/83, 84, 261/119.1, DIG. 16, DIG. 26
See application file for complete search history.

(56) References Cited

U.S. PATENT DOCUMENTS

| | | | | |
|---|---|---|---|---|
| 2,688,473 A | * | 9/1954 | Posch | 366/51 |
| 2,825,542 A | * | 3/1958 | Jackson | 261/87 |
| 3,356,349 A | | 12/1967 | Keppler | |
| 5,323,973 A | * | 6/1994 | Ferrara, Jr. | 241/37.5 |
| D452,111 S | | 12/2001 | Lane | |
| 6,558,035 B2 | | 5/2003 | Lane | |
| D493,330 S | | 7/2004 | Lane | |
| D613,988 S | | 4/2010 | Lane et al. | |
| 2001/0036124 A1 | | 11/2001 | Rubenstein | |
| 2003/0150879 A1 | * | 8/2003 | Ufheil et al. | 222/190 |
| 2004/0159624 A1 | | 8/2004 | Miller et al. | |
| 2007/0165484 A1 | | 7/2007 | Branson et al. | |
| 2007/0221068 A1 | | 9/2007 | Boussemari et al. | |
| 2008/0233264 A1 | * | 9/2008 | Doglioni Majer | 426/594 |
| 2011/0110185 A1 | * | 5/2011 | Miller et al. | 366/314 |
| 2011/0203462 A1 | * | 8/2011 | Boussemart et al. | 99/453 |

FOREIGN PATENT DOCUMENTS

| | | |
|---|---|---|
| DE | 1 557 244 A1 | 3/1970 |
| EP | 1 656 866 A | 5/2006 |

(Continued)

*Primary Examiner* — Reginald L Alexander
(74) *Attorney, Agent, or Firm* — Craig A. Fieschko, Esq.; DeWitt Ross & Stevens S.C.

(57) ABSTRACT

A milk frothing device comprises a housing (2) including a container (10) for receiving the milk to be frothed, and a frothing means (20), wherein the container comprises a side wall (11), a bottom portion (13) and an inclined wall portion (12), wherein the inclined wall portion is inclined with respect to the side wall and is confined by the side wall and the bottom portion, wherein the container and the frothing means together form an asymmetrical arrangement.

13 Claims, 5 Drawing Sheets

(56) References Cited

FOREIGN PATENT DOCUMENTS

| | | |
|---|---|---|
| EP | 1 987 750 A2 | 11/2008 |
| EP | 2 071 989 A1 | 6/2009 |
| FR | 2 795 875 A | 1/2001 |
| GB | 1 339 827 A | 12/1973 |
| GB | 2 055 248 A | 2/1981 |
| WO | WO 2008/142154 A1 | 11/2008 |

* cited by examiner

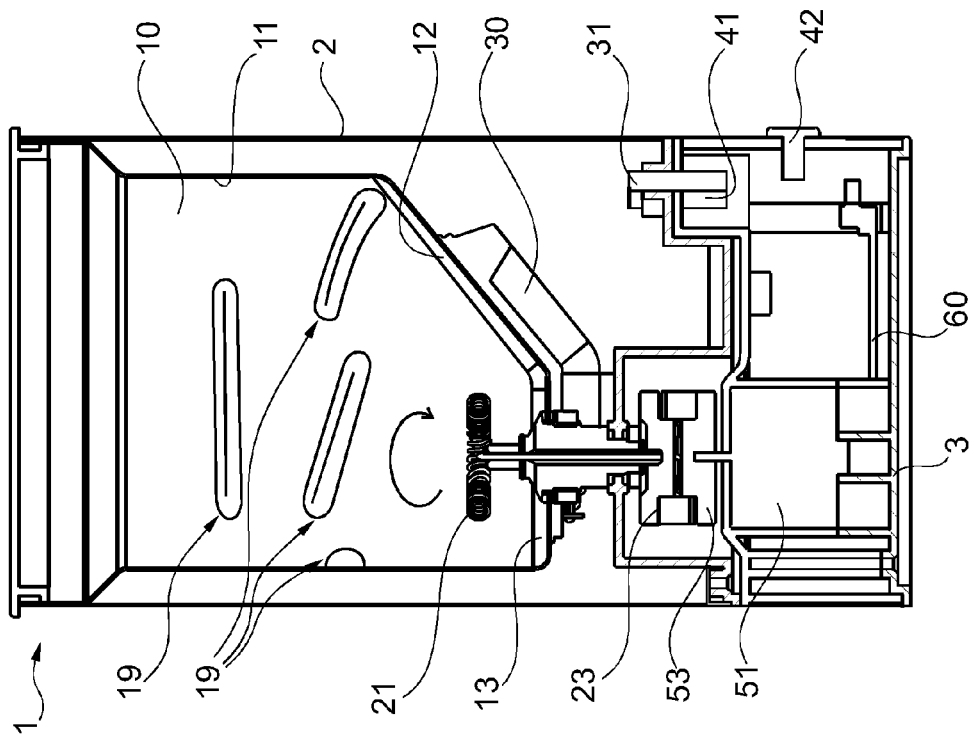
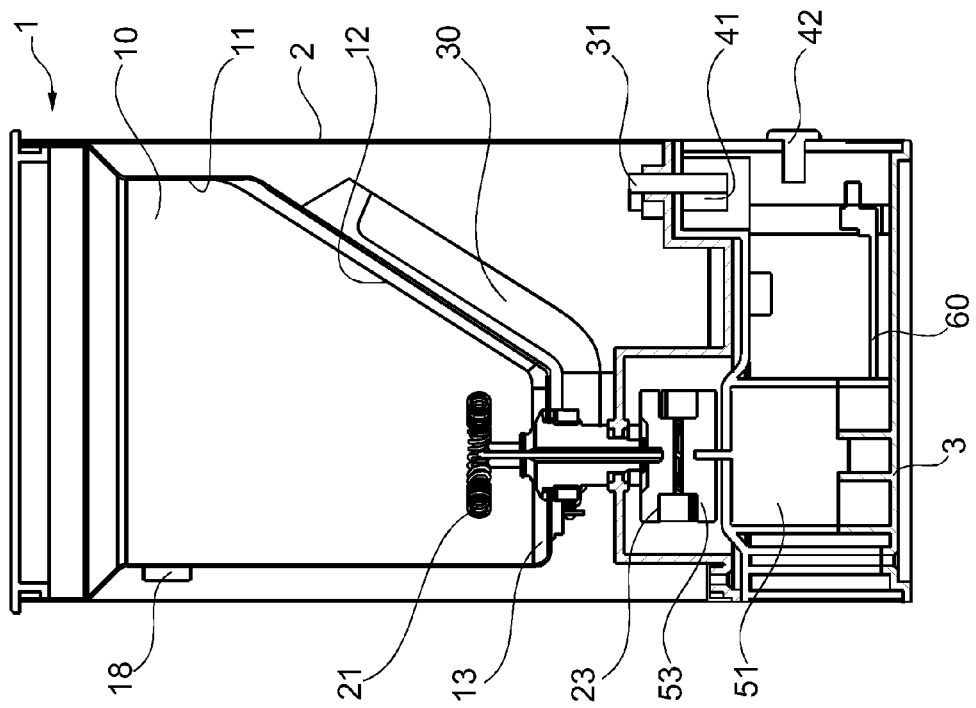

MILK FROTHING DEVICE

The present invention relates to a device for frothing milk, and in particular to a milk frothing device which provides for an improved frothing process.

In recent times, preparing warm beverages including coffee and hot chocolate has become more and more popular. Such beverages often include frothed milk. For this purpose, different types of milk frothing devices have been provided. Some have a whisk at one end of a rod or axle, at the other end of which is a housing adapted to be grasped by the user, and containing a motor and battery power source. Others provide a container for receiving the milk to be frothed as well as a drop-in whisk. It is generally warm milk which is frothed. Several of these devices also include a heater, in order to combine the heating and the frothing process.

From US 2007/0221068 for example an appliance for preparing a froth from a milk-based liquid is known, which includes a tank for receiving liquid that is to be frothed, and in which liquid a rotatable stirrer is positioned, a stand associated with the tank, and a system for driving this stirrer. The stirrer drive system and the stirrer include magnetic elements allowing the stirrer to be rotationally driven magnetically in the tank. Disturbance means are provided to break or prevent symmetric circulation of the liquid about the median vertical axis of the tank.

Further, from EP 1 987 750 an appliance for warm milk preparation is known consisting of a reservoir for the milk, a removable cover with a frother and an electric circuit opportunely fed and controlled automatically by means of a temperature sensor.

Further, US 2001/0036124 describes a beverage container with integrated stirring device, which provides a drinking container cup, such as for coffee, tea, soup or the like, having an interior and an exterior surface, said container having an integrated powered stirring device extending from the interior surface of the bottom section of the housing and driven by a small battery powered motor located in the bottom section of the housing.

All of the devices provide for a single stirring device, which brings the milk into a rotation leading to a swirl, so that in the rotational axis, normally the median vertical axis, the milk level decreases, wherein the milk level apart from the median vertical axis increases. For devices with a de-central stirring device, this may also lead to an oscillation leading to a further increase of the milk level at the side wall owing to centrifugal force, so that the milk slops and is no longer available for the frothing process. This is particularly the case for larger quantities, for example above 100 ml of milk. Even if particular obstacles are provided for reducing the swirl effect, those obstacles described in the prior art lead to a geometry, which is very difficult to clean effectively.

Therefore, there may be a need to provide a milk frothing device which provides for an improved frothing process, in particular by providing a milk frothing device which does not lead to slopping of the milk contained in the milk container.

In view of the above, it would be desirable to provide an improved milk frothing device over the prior art, which provides for an optimized frothing process.

The present invention provides for a device according to the subject-matter of the independent claim 1, wherein further embodiments are incorporated in the dependent claims.

According to an exemplary embodiment of the invention the milk frothing device comprises a housing including a container for receiving the milk (or other liquid) to be frothed, and an agitation means, wherein the container comprises a side wall, a bottom portion and an inclined wall portion, wherein the inclined wall portion is inclined with respect to the side wall and is confined by the side wall and the bottom portion, wherein the container and the agitation means together form an asymmetrical arrangement.

In accordance with a second aspect of the present invention there is provided a method of making frothed milk using an apparatus of the first aspect.

It will be understood that the agitation means causes the frothing. The agitations means could be called a "frothing means" or simply a "whisk". An "agitation means" or "frothing means" or "whisk" in this specification means a device which can introduce sufficient air into milk to change the physical form of the milk. The terms "agitation means" or "frothing means" or "whisk" do not imply any other limitation, for example a limitation to any particular physical construction.

We use the words froth/frothed/frothing in this specification but the words foam/foamed/foaming can be substituted therefor.

We use the word "milk" in this specification to denote pure milk and also milk-based liquids, preferably having a major weight proportion of pure milk. Other liquids having the ability to form a froth may be processed using a device in accordance with the first aspect or by a method process in accordance with the second aspect.

The device of the first aspect may be used to carry out the method of the second aspect. The method of the second aspect may be carried out using the device of the first aspect.

The definitions of the invention set forth in this specification may be applied to both the method of the first aspect and the apparatus of the second aspect unless the context or an express statement demands otherwise.

Thus, it can be achieved that due to the asymmetrical arrangement in combination with the inclined side wall, the liquid in the container will not increase in level during the agitation, to the degree that would increase, in other arrangements. Although the agitation means when it rotates may provide for a rotation of the liquid in the container, the asymmetrical arrangement of the agitation means and the container geometry may keep the maximum level of the liquid low. Further, a sufficient mixing and distribution of the liquid will take place so that every portion of the liquid will pass the agitation means. In particular by providing the inclined wall portion, this wall portion will compensate the level increasing effect of the rotation by the agitation means, as well as the oscillation of the liquid level. The inclined wall portion together with the side wall and the bottom portion provide surfaces which are easy to clean, since no further obstacles are necessary for suppressing the oscillation of the liquid within the container. In should be noted that nevertheless additional obstacles or protrusions can be provided, in particular in form of a particular side wall structure of the container. Such a side wall construction may for example be elongated protrusions in a circumferential direction in an even or screw like manner, in order to avoid the increasing of the level of the liquid owing to a swirl effect.

It should be noted that an inclined wall portion is inclined with respect to a vertical side wall and a horizontal plane as well, so that the inclined wall portion may be in form of a slope or ramp or flange. It should also be noted, that the inclined wall portion can as an alternative also be provided between a lower side wall and an upper side wall. Alternatively the inclined wall portion can also constitute a fully inclined bottom, wherein a bottom portion then constitutes the lowest portion in the container. In effect, in such an embodiment, the bottom portion is the conjunction of the inclined wall and the side wall.

Preferably, however, the bottom portion is a distinct bottom wall portion defining an area defined by x- and y-directions and the inclined side wall portion is confined by the side wall and the bottom wall portion.

According to an exemplary embodiment of the invention the agitation (frothing) means is positioned opposite to the inclined wall portion. It may be aligned with the inclined wall portion. The alignment is horizontal alignment when the device is in its use orientation.

This provides for a kind of damping effect with respect to the centrifugal forces of the rotating milk from the frothing means. By providing the frothing means opposite to the inclined wall portion, the frothing means can be provided in the vicinity of the inclined wall portion allowing to immediately damp the oscillating tendency of the rotating liquid or milk.

According to an exemplary embodiment of the invention the frothing means comprises a frothing head and a rod, wherein the frothing means is mounted to a first end of the rod, wherein the container comprises a duct, wherein the rod extends through the duct so that the frothing means is provided within the container.

Thus, the frothing means can be driven by a rod extending through a duct to the outside of the container, so that a driving means for driving the frothing means in general is not provided within the container. It should be noted that the rod may also be divided into parts having a hinge coupled in between, in particular when the rotational axis of a driving means and the rotational axis of the frothing means is inclined or offset.

According to an exemplary embodiment of the invention the duct is provided at the bottom portion of the container.

Thus, it is easy to mount the frothing means and the driving means in a vertical axis, in particular when the bottom portion is a flat and horizontal portion with respect to the normal operating position of the milk frothing device. However, it should be noted that the duct may also be provided in the inclined portion, which allows to incline the total frothing process, which may also reduce the oscillating of the milk or liquid as well as the increasing of the milk level during frothing. In particular, when providing the duct in the inclined surface, gravitational forces may provide for additional damping of the oscillating effect together with an asymmetrical arrangement.

According to an exemplary embodiment of the invention, the rod on a second end is provided with a first mechanical coupling element.

This allows to couple and to decouple the frothing means to or from a driving means. This is for example of relevance, if the container should be removed from the driving means, for serving the frothed milk, so that not the complete milk frothing device but only the container or the housing can be handled, which is much more convenient than taking the whole milk frothing device. The mechanical coupling element may be for example a kind of rubber plate, a gear or a coupling blade cock. If using a rubber as a surface, such a coupling device is easy to be coupled in a force fit manner to a counter part. It should be noted that also a kind of rubber lamella or rubber pins may serve as a coupling surface of the first mechanical coupling element. In particular an automatically engaging coupling element can be used so that the user does not have to take care on the correct coupling position.

Depending on the arrangement, there may be a rod with the motor at one end and the frothing means at the other (direct motor drive); or the rod may be interrupted by mechanical coupling elements (i.e. gears), provided to raise or lower the speed of the frothing means relative to the speed of the motor, and/or to allow the frothing means, in the container, to be detached from the motor, in a base part, for example for pouring frothed milk, or cleaning.

Alternatively there may be a magnetic drive mechanism wherein the whisk is carried by or associated with a magnetic follower, driven by a magnetic drive inducer. The magnetic follower may be outside the container and connected to the whisk by a rod passing through a said duct. Preferably however a magnetic follower is located inside the container and so no said duct is present in the container wall.

Thus in general it may be stated that the frothing means may be driven by a driving mechanism at least partly outside the container, for example by a motor, suitably connected to the frothing means by a rod or axle; or by or a magnetic drive inducer, the whisk being associated with a magnetic follower.

Whilst it is not excluded that the milk may be pre-warmed, then added to the container, preferably the milk is warmed in-situ, as frothing takes place. Preferably the milk when added is at a temperature of 3 to 10° C.

According to an exemplary embodiment of the invention, the housing further includes a heating element. The heating element may be attached to at least an inclined wall portion. According to a preferred embodiment of the invention, however, the heating element is attached to a bottom wall portion. The heating element may be a ring-shaped heating element located about a said rod.

Thus, the heating of the milk within the container can take place at the same time as the frothing process, so that both the heating and the frothing can take place in parallel in order to save time. This is in particular of relevance under domestic and professional aspects in gastronomy. Preferably heating and operation of the frothing means commence substantially simultaneously.

According to an exemplary embodiment of the invention, the inclined wall portion is provided off-centre.

The off-centre location of the inclined wall portion serves for an improved asymmetric geometry, which reduces the oscillation of the milk or liquid in the container.

According to an exemplary embodiment of the invention, the inclined wall portion is flat.

This provides in particular for an improved cleaning effect, and further allows for easier mounting of a heating element at the back of the inclined wall portion of the container, when that is the location of mounting.

The wall portion may have an inclination of about 45°± (plus/minus) 15° with respect to a virtual horizontal plane during normal operation. Thus, oscillation of the rotating milk can be significantly reduced. The size of the inclined surface may be for example 50% of the size of a surface of the bottom portion of the container. In other words, the amount of the surface of the bottom portion and the amount of a surface of the inclined wall surface may be in a similar dimension or may deviated from each other of up to about 20%. In particular, the amount of the inclined wall surface may be somewhat larger than the amount of the horizontal bottom surface.

According to an exemplary embodiment of the invention, the frothing means is provided off-centre of the container.

In particular, for those embodiments having a horizontal bottom portion, the off-centre frothing means can be provided with the rod being in a vertical direction. In combination with the inclined surface being off-centre, the frothing means also being off-centre can provide for a reliable damping of the oscillation and therefore avoid an unintentional increase of the milk level during the frothing process.

According to an exemplary embodiment of the invention, the side wall portion is of cylindrical form and the bottom wall portion, where present, is flat, wherein the duct is provided in the flat bottom wall portion. In particular, if the side wall portion is of cylindrical form and the bottom wall portion is flat, an optimized volume ratio of the container content and the size of the total milk frothing device may be obtained.

According to an exemplary embodiment of the invention, the milk frothing device further comprises a releasable base portion for receiving the housing, wherein the base portion is provided with a driving means, wherein the driving means is provided with a second mechanical coupling element, wherein the second mechanical coupling element is adapted for being coupled to a first mechanical coupling element connected to the frothing means, when the base portion receiving the housing.

Thus, a driving means, for example a motor or a spring or the like can be maintained in the base portion, wherein the container and the housing of the milk frothing device can be handled for an easier serving. The second mechanical coupling element may be in particular designed for receiving the first mechanical coupling element in order to provide for an optimum transmission of the torque from the driving means to the frothing means. The second mechanical coupling element may be for example designed in an identical manner as the first mechanical coupling element, which reduces the manufacturing costs owing to identical coupling elements. However, the second mechanical coupling element may also be made of a different surface being particularly adapted to form a force fit connection between the first and second mechanical coupling element.

According to an exemplary embodiment of the invention, the housing further includes a first electrical coupling element connected to the heating element, wherein the base portion comprises a second electrical coupling element, wherein the second electrical coupling element is adapted for being coupled to the first electrical coupling element when the base portion receiving the housing.

For this purpose, also the complete electrical connections for a power supply can be provided in the base portion, so that for an easier handling, no wired connections remain, wherein all functional couplings, e.g. electrical coupling and mechanical coupling takes place when the base portion receiving the housing.

According to an exemplary embodiment of the invention, the second electrical coupling element is provided off-centre of the base portion.

This provides an easier handling for the user, in particular when the second electrical coupling element is provided closed to the edge of the base portion. Thus, the user can recognize how to couple the base portion and the housing of the milk frothing device in order to ensure that not only the electrical connection but also the mechanical connection takes place between the base portion and the housing of the milk frothing device. A recess in the housing corresponding to a protruded socket in the base portion, in particular close to the edge, provides for an easier handling and ensures that the respective electrical and mechanical connections are established for a safe use.

According to an exemplary embodiment of the invention, the housing includes the duct, the heating element, the first electrical coupling element and the first mechanical coupling element sealed in a dishwasher-proof manner.

There a base portion is provided, which contains the second, matching, electrical coupling element and the second, matching, mechanical coupling element. The base unit may contain power supply equipment including a transformer if required, and the driving mechanism, and any electrical control parts, for example a CPU or PCB.

In accordance with a preferred embodiment of the invention there is provided a milk frothing device of the first aspect wherein the milk frothing device comprises control means providing the following functions:

means for providing a plurality of temperature measurements of milk in the container means for calculating from the temperature measurements the milk volume in the container means for determining therefrom the milk temperature at which heating is terminated.

The latter means may use stored information, whereby the operation of a heater is terminated at a lower temperature for a smaller volume of milk than for a higher volume of milk.

Suitably there is provided means for calculating from the temperature measurements the temperature gradient in the milk, and using the temperature gradient to calculate the milk volume in the container.

The housing can for example be obtained by a casting, molding or other sealing between a bottom portion and an outer portion of the housing, so that a sealed interior of the housing can be established. This allows for example to put the housing including the container and the agitation means into a dishwasher, but to maintain the main electrical components as the operation bottom, a printed circuit board and the motor outside the dishwasher, since usually, only the interior fill volume of the housing (the container) will be contaminated with milk or liquid during normal use.

The container preferably comprises a filling volume of at least 75 ml, preferably at least 100 ml.

The container preferably comprises a filling volume of not greater than 200 ml, preferably not greater than 150 ml.

The container may have markings to show the minimum and maximum quantities of milk to be added to the container.

Due to the expanded volume of the forth the container requires an absolute volume considerably in excess of the volume of milk which may be added to it.

Preferably the container comprises an absolute volume of at least 500 ml.

Preferably the container comprises an absolute volume of up to 750 ml.

Thus, in embodiments of the invention frothed milk can be prepared for a plurality of beverages simultaneously. It should be noted that the filling volume of the container is defined as the volume of milk which can be received without slopping during normal operation of the milk frothing apparatus. In other words, the filling volume may also be increased by only keeping low the liquid level in normal use. The absolute volume is the total volume of the container i.e. the maximum volume of liquid (or liquid/froth) which the container can hold.

In all preferred embodiments of the invention the frothing means (or agitating means, or whisk) is of a filamentary form, preferably a metallic or plastics filamentary form sufficiently robust to withstand repeated frothing operations in warm milk. A preferred form of frothing means is a toroidal body provided by taking a helix, bending it, and holding it in a toroidal shape, for example by joining it, end-to-end and/or using a retaining ring. Preferably such a frothing means, when mounted to the rod or axle, is mounted centrally and perpendicularly so as to co-rotate with the rod, without giving rise to torsional forces or imbalance.

In all embodiments of the invention the frothing means preferably has an overall plan area (footprint) not exceeding 20 cm$^2$, preferably not exceeding 10 cm$^2$, and most preferably in the range of from 3 to 8 cm$^2$.

In all embodiments of the invention the frothing means may be removable, either with or without the rod, for separate cleaning.

Preferably the whisking process does not involve the delivery of steam to the milk.

According to another aspect of the present invention there is provided a milk frothing device comprising a housing including a container for receiving the milk to be frothed, i.e. a frothing means (agitation means, whisk) and a releasable base portion for receiving the housing, wherein the agitation means is provided with a first mechanical coupling element, wherein the base portion being provided with a driving means, wherein the driving means is provided with a second mechanical coupling element, wherein the second coupling element is adapted for being coupled to the first coupling element when the base portion receiving the housing.

Thus, a housing portion of a milk frothing device can be released from a base portion, so that the housing of the milk frothing device can be used for an easier handling for serving frothed milk. The same way, a first mechanical coupling element can be released from a second mechanical coupling element, so that the first mechanical coupling element remains at the housing portion, wherein the second mechanical coupling element remains at the base portion of the milk frothing device. Thus, all sensitive elements of the milk frothing device, in particular the motor and the main electrical components remain at the base portion, wherein the housing of the milk frothing device can easily be handled and also be dropped into a dishwasher or in a basin for cleaning, without affecting the sensitive elements like the motor and the electrical contacts and controlling components and switching elements.

According to an exemplary embodiment of the invention the agitation means comprises a frothing means and a rod, wherein the frothing means is mounted to a first end of a rod, and wherein the container comprises a duct, wherein the rod extends through the duct, so that the frothing means is provided within the container, and the rod on a second end is provided with a first mechanical coupling element.

According to an exemplary embodiment of the invention, the duct is provided at the bottom portion of the container, as already described above. The duct together with the rod may constitute a slide bearing.

According to an exemplary embodiment of the invention, the container comprises a side wall, a bottom portion and an inclined wall portion, wherein the inclined wall portion being inclined with respect to the side wall and being confined by the side wall and the bottom portion. Thus, a swirl owing to a circular movement of the milk leading to slopping can be damped, so that the milk level does not increase so much owing to the damping effect of the inclined wall portion as described above. This may also lead to an optimized mixing of the milk to let pass the frothing means all portions of the milk.

According to an exemplary embodiment of the invention, the housing further includes a heating element, the heating element being attached to the container. Thus, both processes can be conducted in parallel, the frothing process and the heating process of the milk or any other beverage or liquid in the container.

According to an exemplary embodiment of the invention, the housing further includes a first electrical coupling element connected to the heating element, wherein the base portion comprises a second electrical coupling element, wherein the second electrical coupling element is adapted for being coupled to the first electrical coupling element when the base plate receiving the housing. Thus, also a releasable connecting of the heating element with the base portion can be carried out, as described above.

According to an exemplary embodiment of the invention, the housing includes the duct, the heating element, the first electrical coupling element and the first mechanical coupling element sealed in a dishwasher proved manner, as described above.

According to an exemplary embodiment, the container further comprises an opening for filling in and pouring out milk to be frothed. This opening can be covered by a cover. This cover may also be provided with a seal to avoid slopping and to provide a tight fixing of the cover.

It should be noted that the above features may also be combined, wherein the combination of the above features may also lead to a synergetic effect, even if not explicitly described in detail.

These and other aspects of the present invention will become apparent from and elucidated with reference to the embodiments described herein after.

Exemplary embodiments of the present invention will be described in the following with reference to the following drawings:

FIG. 6 illustrates an embodiment of the invention, wherein the inclined wall portion is steeper.

FIG. 8 illustrates an embodiment of the invention including elongated protrusions.

Figure 1:
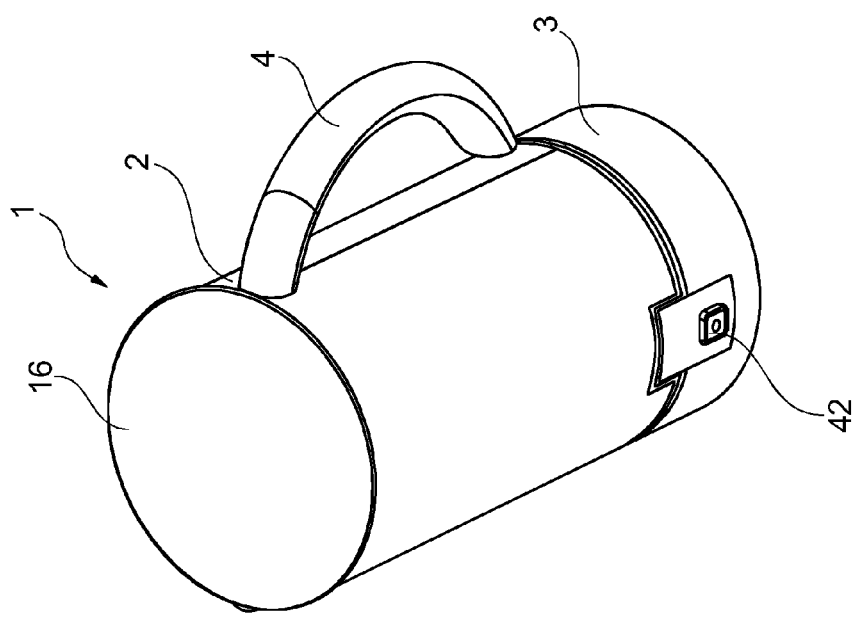
FIG. 1 illustrates a milk frothing device according to an exemplary embodiment of the invention having a housing and a base portion, wherein the base portion received the housing of the milk frothing device.

FIG. 1 illustrates a milk frothing device 1 with a housing 2 and a base portion 3 according to a exemplary embodiment of the invention in a combined position. The milk frothing device 1 comprises a housing portion 2 and a base portion 3, wherein the housing portion 2 can be released from the base portion 3. The housing portion may comprise a handle 4, which may provide for an easier handling of the housing portion of the milk frothing device 1. In order to maintain the heat within a container of the milk frothing device, the milk frothing device 1 can be provided with a cover 16. The cover may be provided as a transparent cover in order to monitor the frothing process within the container of the milk frothing device.

The frothing process may be started with an operation button 42, which may be provided at the base portion 3 of the milk frothing device 1. When pushing the operating button, the heating process will be started e.g. synchronously to a frothing process within the container. When a particular temperature is reached, the heating process will stop in order to avoid overheating of the milk. The frothing process may also be stopped depending on the temperature of the milk. The frothing process may also be stopped after a particular lapse of time. It should be noted that also for the frothing process particular sensors 18 may be provided within the housing, in order to monitor the success of the frothing process, for example by a ultrasonic sensor, which can monitor the acoustic properties within the container depending on the foam development of the frothed milk.

Figure 2:
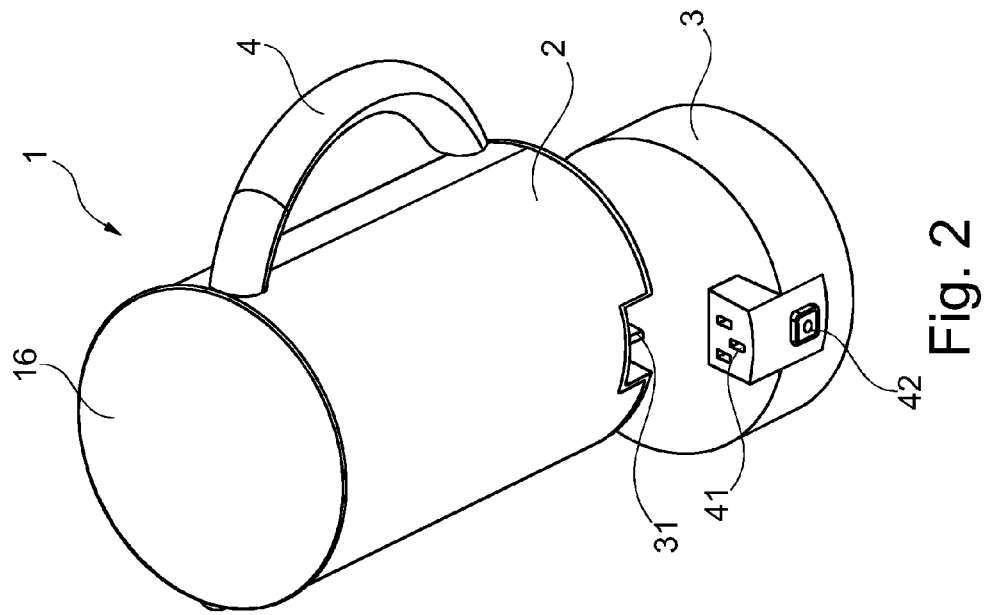
FIG. 2 illustrates a milk frothing device according to an exemplary embodiment of the invention, wherein the housing portion is released from the base portion of the milk frothing device.

FIG. 2 illustrates a milk frothing device 1 as already depicted in FIG. 1, however, in a released situation, where the housing portion 2 of the milk frothing device 1 is released from a base portion. When releasing the housing portion 2 from the base portion 3, a contact 31 on the housing portion side can be released from a contact 41 on the base portion side. When providing the plug/socket 31/41 at the edge of the housing portion 2 and the edge of the base portion 3, respectively, a user can easily monitor when putting the housing portion 2 onto the base portion and to receive the correct positioning thereof. It should be noted that the plug/socket 31/41 can also be provided as a separate unit and that a separate forming of the edge of the base portion corresponding to the edge of the housing portion may be provided for providing an easier fit of housing 2 and the base portion 3. When releasing the housing portion 2 from the base portion 3, a frothing process and a heating process may be stopped automatically. A particular electronic in the base portion may detect the release of the housing portion, in order to interrupt the circuit to provide the heater with electrical current. A base portion may be provided with a connector plug to the grid, which, however, is not illustrated in the Figures.

Figure 3:
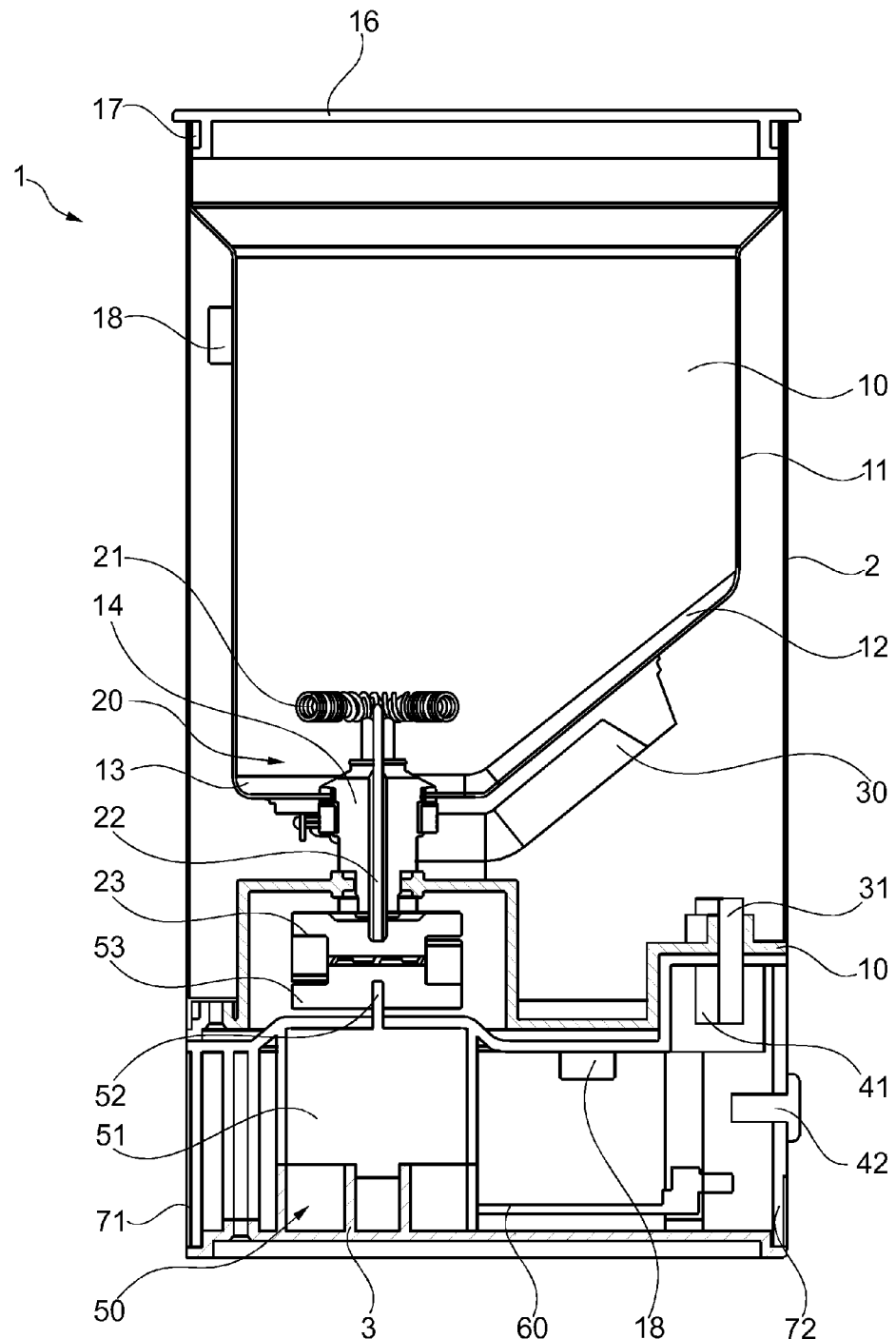
FIG. 3 illustrates a cross-sectional view of an exemplary embodiment of the milk frothing device.

FIG. 3 illustrates an exemplary embodiment of a milk frothing device 1 according to the present invention. The milk frothing device 1 comprises a housing portion 2 and a base portion 3. The housing portion 2 may be released from the base portion 3 in order to provide an easier handling of the housing portion during serving milk or other frothed beverages in the container 10. The container 10 in the illustrated embodiment comprises a cylindrical side wall portion 11, an inclined wall portion 12 and a bottom portion 13. However, it should be noted that in particular the side wall portion 11 may also be of a different shape and does not have to be formed in a cylindrical shape. There is a void in the housing beneath the container. In the illustrated embodiment, a duct 14 is provided in the bottom portion 13 of the container 10 in order to provide a duct for a rod 22 of an agitation means 20. The agitation means 20 comprises an agitator or frothing means or whisk 21, which may be provided as a circular metal ring with a coil wounded around the ring in order to provide an improved frothing process. For these examples we will use the term whisk. The whisk 21 is provided at one end of the rod 22, wherein on the other end of the rod 22 there is provided a mechanical coupling element or gear 23. The mechanical coupling element may engage with a corresponding mechanical coupling element or gear 53 of the base portion 3, when the housing 2 is received on the base portion 3. When releasing the housing portion 2 from the base portion 3, the mechanical coupling element 23 will also be released from the mechanical coupling element 53. It should be noted that even if not shown, there may also be provided some spring or resilient members, which provide for a sufficient mechanical coupling between the mechanical coupling elements 23 and 53.

The base portion 3 comprises a drive means 50, which in the present embodiment further comprises a motor 51, a DC motor in this embodiment, and a rod 52 connected to the motor. The second mechanical coupling element 53 is mounted to the end portion of the rod 52. The housing portion 2 further comprises a first electrical coupling element 31 which correspondingly engages into a second electrical coupling element 41 of the base portion 3. This connection between the coupling elements 31 and 41 provides for an electrical contact between the base portion 3 and the housing portion 2 in order to provide a heating element 30 with electrical energy. The heating element is mounted in the void in the housing beneath the container. It should be noted that the electrical connection between the first electrical coupling element 31 and the heating element 30 is not shown in FIG. 3. It should be noted that a heating element may be a conventional heating element as well as a heating film or a micro wave device. The heating element may be at least partially provided at the inclined wall portion of the container 10, in order to provide a heating impact to the milk or liquid contained in the container 10. The container may be fixed to the housing portion by a press fitting or welding or soldering process at the top portion of the housing 2. It should be noted that the space between the housing 2 and the container 10 may also be filled with an insulating material in order to avoid a heat loss from the inside of the container to the outside. The housing portion 2 may also comprise a cover 16, which may be sealed by a circumferential seal 17 to the container 10.

The base portion 3 may comprise a frame construction 72, which may be covered by an outer shell 71, which may for example be provided as a design surface of the base portion.

Further, inside the base portion 3 there may also be provided a printed circuit board 60, which may include a control circuit for controlling the driving means as well as the heating element. Onto the printed circuit board, also electronics can be provided which control particular sensors (not shown) which may control a sufficient heating process to not overheat the milk to be foamed, and sensors 18 which may monitor a sufficient foaming process. Foaming sensors may for example be ultrasonic sensors measuring the acoustic properties of the foamed milk, which will substantially change between a foamed and an un-foamed condition, since foamed or frothed milk has a very much higher acoustic damping coefficient compared to un-frothed milk. However, as an alternative, also visual sensors may be provided in order to monitor the filling level of the container 10. Frothed milk has a larger volume than un-frothed milk, so that based on the filling level of the container, a frothing process may be monitored. Further, a frothing process can be stopped when filling too much milk into the container 10, so that the milk frothing device can also be operated with an open cover, without the risk that the foamed milk will slop out of the container 10. For connecting particular sensors to the container 10 for monitoring the frothing process, further contacts, plugs and sockets may be provided between the housing 2 and the base portion 3, although not shown.

However, the acoustic damping of the frothed milk in the container can also be measured from the base portion, since also the acoustic properties of the environment of the base portion will change, when the milk in the container 10 progresses from an un-frothed to a frothed condition.

Figure 4:
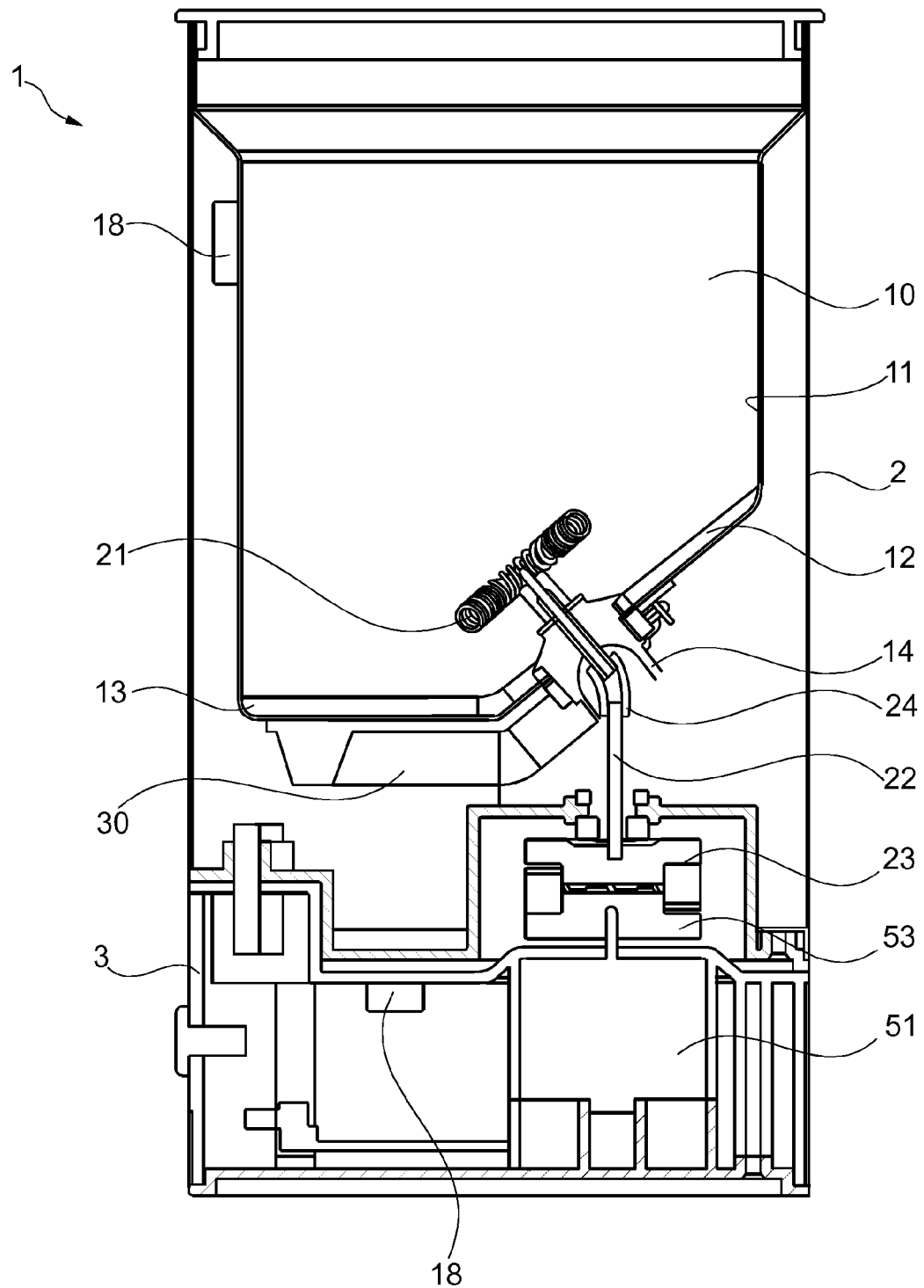
FIG. 4 illustrates a further embodiment of the invention wherein the agitation means is provided in the inclined wall portion.

FIG. 4 illustrates a further embodiment in which the whisk is provided on the inclined wall portion. The rod 22 for this purpose may be divided in two parts and may be coupled with a hinge 24. With such an arrangement of the whisk 21 in addition to the inclined surface 12 also gravitational effects may be used for damping the oscillation of the milk or the liquid in the container 10. For such an embodiment, the heating element 30 may be provided on the bottom portion 13 of the container 10.

FIG. 4 further illustrates possible positions of a sensor element 18 which may be provided either in the direct vicinity of the container 10 or as an alternative in the base portion 3. These sensor elements may be based for example on ultrasonic effects, so that an acoustic damping between un-frothed milk and frothed milk can be compared in order to come to the conclusion that a frothing process is completed. Further, in particular a sensor device in the vicinity of the container 10 may be used for determining the level of the liquid, in order to stop a heating or frothing process to avoid a slopping of milk. The coupling elements 23 and 53 can also be provided as beveled gears in order to avoid a hinged rod 22.

Figure 5:
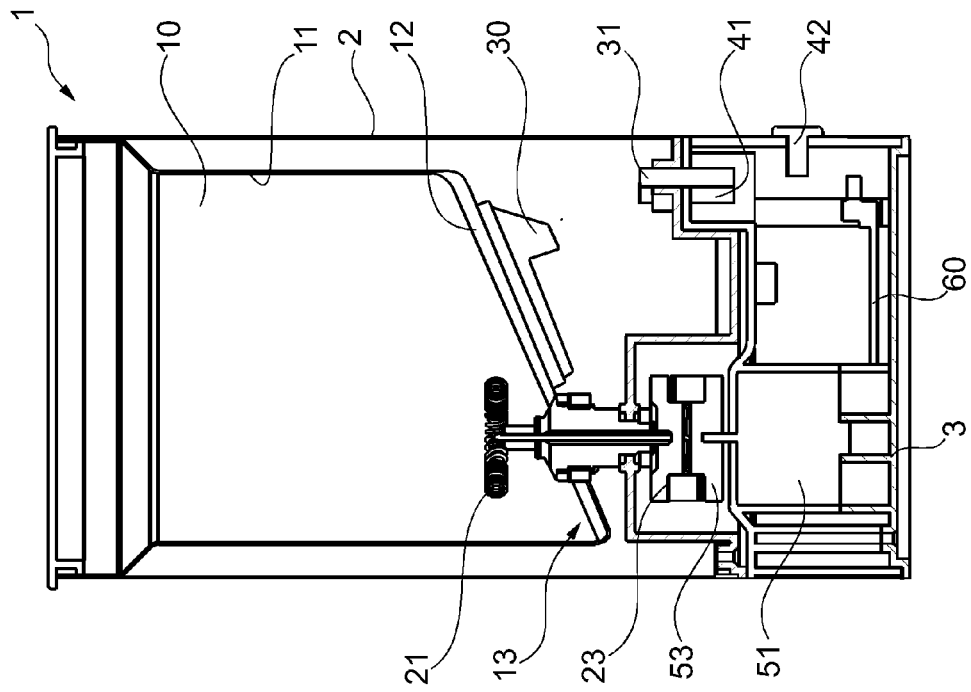
FIG. 5 illustrates an embodiment of the invention, wherein the inclined wall portion is flatter.

FIG. 5 illustrates a further exemplary embodiment, where the inclination of the inclined wall portion 12 is somewhat flatter with respect to the base portion 13 or a virtual horizontal plane, so that the total volume of a container 10 will be larger without the need to increase the total size of the milk frothing device 1.

As an alternative, FIG. 6 illustrates a further embodiment, where the inclined wall portion 12 is somewhat steeper with respect to the bottom portion 13, so that the total container shape is somewhat more like a taper. This further allows the size of the heating element 30 to be increased, so that the heating process may be shortened with respect to the total duration of the frothing process.

Figure 7:
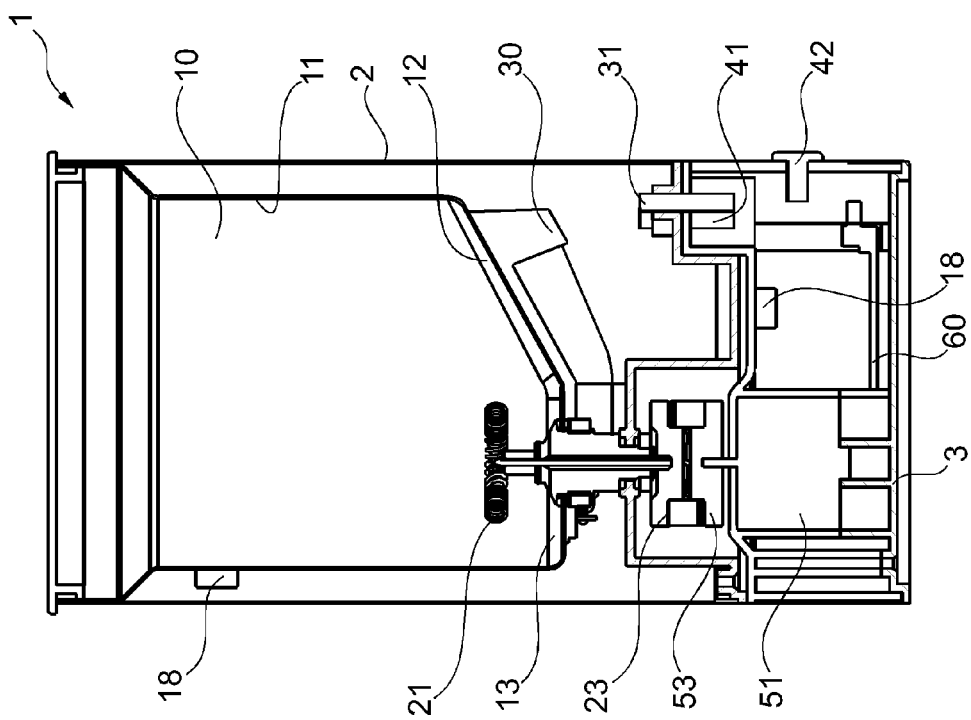
FIG. 7 illustrates an embodiment of the invention, wherein the inclined wall portion extends over the complete width of the container.

As an alternative embodiment, FIG. 7 illustrates a container having an inclined wall portion 12, which extends over the complete width of the bottom of the container 10, so that the bottom portion 13 can be considered as the deepest portion in the container 10. It should be noted that also other inclination angles can be provided in order to obtain the asymmetric arrangement of the whisk and the inclined wall portion. In the embodiment of FIG. 7, the duct may be not orthogonal with respect to the here inclined surface through which the duct ducts.

FIG. 8 illustrates a further exemplary embodiment of the invention, according to which the wall portion of the container 10 is provided with elongated protrusions which may avoid the increasing of a liquid level during stirring or frothing. The protrusions may extend along a horizontal line. However, the protrusions may also be inclined in a screw like manner, in order to bring or keep down the liquid level during a stirring or frothing process. It should be noted that the negative inclination of the protrusions 19 with respect to the movement direction of the milk to be frothed may compensate the centrifugal forces and increasing level owing to the rotational movement in the depicted manner.

In an alternative embodiment to those shown and described the heating element may be ring-shaped and mounted in the void in the housing beneath the container, on the wall separating the container and the void, and around the rod.

In an alternative embodiment, to those shown and described, the driving means may be a magnetic drive instead of a conventional motor, so in this embodiment the motor, rod and mechanical coupling elements are not needed.

In any of the above embodiments the frothing means may be detached by the user, for an intensive washing operation. Milk residues that form on heating are tenacious and it is desirable to be able to detach the frothing means for extra cleaning, if needed.

In any of the above embodiments the region of the housing portion beneath the container may contain a one-way valve arranged to allow air to vent from the region on initial dishwashing, but thereafter to prevent the inflow or air or water.

The apparatus of any of FIGS. 1 to 8 may be used in the following manner. The heating element and the frothing means are switched on at the same time; often the milk is cold from the fridge when the process starts. A sensor covered by the milk samples the temperature of the milk frequently. After a period during which a number of temperature samples have been taken a calculation is made of the temperature gradient, and, consequently, of the quantity of milk in the container. A cut-off temperature is then determined. This is the temperature at which the heater is switched off. This cut-off temperature differs, for different calculated volumes of milk. When the heater is switched off there is still residual heat in the heater to continue transferring heat to the milk. Residual heat supplied to a small volume of milk will cause a greater additional temperature increase, than that supplied to a large volume. Hence the cut-off is temperature lower for a smaller volume of milk than for a larger volume.

At an advanced stage of the frothing process (which may for example be determined by the temperature of the milk or by a point in time related to the time at which the heater cut-off) the milk will be fairly well frothed and it would be difficult to turn more of the milk into froth. At this stage the rotation speed of the frothing means is reduced, typically by about one-third. This could be done gradually but is preferably done suddenly. The purpose of the reduced speed is to turn the initially-frothed milk—which may be coarse—into a smoother, denser foam. Finally at some later point (determined by milk temperature or time) the frothing means is turned off and the required amount of frothed milk at the correct temperature is left in the container.

It should be noted that the term "comprising" does not exclude other elements or steps and the "a" or "an" does not exclude a plurality. Also elements described in this association with different embodiments may be combined.

It should be noted that the reference signs in the claims shall not be construed as limiting the scope of the claims.

The invention claimed is:

1. A milk frothing device including:
   a. a container having:
      i. a bottom portion, wherein at least a major portion of the bottom portion is defined by a planar floor surface;
      ii. an oblique wall situated above the bottom portion, wherein at least a major portion of the oblique wall is defined by a planar wall surface oriented at an angle of 30 to 60 degrees with respect to the planar floor surface;
      iii. a cylindrical wall extending from opposing sides of the oblique wall and about the bottom portion;
   b. a whisk rotatably mounted on at least one of the bottom portion and the oblique wall, wherein the whisk is radially offset from a container center situated at the axis of a cylinder defined by the cylindrical wall.

2. The milk frothing device of claim 1 wherein the whisk lacks a cutting edge.

3. The milk frothing device of claim 2 wherein the whisk is defined by a torus formed of coiled wire.

4. The milk frothing device of claim 1 wherein the whisk rotates about an axis situated between the oblique wall and the cylindrical wall.

5. The milk frothing device of claim 1 wherein the bottom portion has a duct defined therein, wherein a portion of the whisk extends through the duct.

6. The milk frothing device of claim 1 wherein:
   a. the whisk includes a frothing element mounted to a first end of a rod, the frothing element being formed of a coil having a length defining a toroidal shape, and
   b. the container includes a duct through which the rod extends.

7. The milk frothing device of claim 1 further including a housing situated adjacent the container, wherein the housing further includes:
   a. a heating element attached to the container;
   b. a control configured to:
      (1) measure the temperature of milk within the container;
      (2) calculate the milk volume in the container from the measured temperature; and (3) determine from the calculated milk volume a milk temperature at which the operation of the heating element is terminated.

8. The milk frothing device of claim 6 wherein the control is further configured to cause rotation of the whisk after operation of the heating element is terminated.

9. The milk frothing device of claim 7 wherein:
a. the milk frothing device further includes a base portion wherein the housing is removably receivable;
b. the whisk bears a first mechanical coupling element;
c. the base portion includes an actuator bearing a second mechanical coupling element configured to removably couple to the first coupling element when the housing is received within the base portion.

10. The milk frothing device of claim 9 wherein:
a. the housing includes a first electrical coupling element connected to the heating element,
b. the base portion includes a second electrical coupling element configured to removably couple to the first electrical coupling element when the housing is received within the base portion.

11. The milk frothing device of claim 10 wherein the second electrical coupling element is radially offset from a container center situated at the axis of a cylinder defined by the cylindrical wall.

12. The milk frothing device of claim 1 further including a base:
a. into which the container is removably received, and
b. actuating the whisk to rotate when the container is received within the base.

13. The milk frothing device of claim 1 wherein the area of the planar wall surface and the area of the planar floor surface are within 20% of each other.

* * * * *